United States Patent [19]
Covell

[11] 3,736,825
[45] June 5, 1973

[54] CUTTING MACHINE BLADE SHARPENER

[75] Inventor: Gerald P. Covell, Taylor, Mich.

[73] Assignee: Uniroyal, Inc., New York, N.Y.

[22] Filed: July 6, 1971

[21] Appl. No.: 159,678

[52] U.S. Cl. ..................83/174, 51/248, 83/488
[51] Int. Cl. ................................................B26d 7/12
[58] Field of Search......................83/13, 174, 488; 51/248

[56] References Cited

UNITED STATES PATENTS

| | | | |
|---|---|---|---|
| 3,233,488 | 2/1966 | Deichmann | 83/174 |
| 1,051,734 | 1/1913 | De Groot | 51/248 |
| 1,195,569 | 8/1916 | Fabian | 51/248 X |
| 1,799,579 | 4/1931 | Berg | 83/174 X |
| 1,918,575 | 7/1933 | Van Berkel | 51/248 |
| 3,165,959 | 1/1965 | Eidson | 83/174 |
| 3,181,406 | 5/1965 | Sayles | 83/174 |

Primary Examiner—Frank T. Yost
Attorney—Philip Sands

[57] ABSTRACT

A sharpener operatively associated with a cutting machine for intermittently honing the blade of the cutter assembly thereof.

7 Claims, 4 Drawing Figures

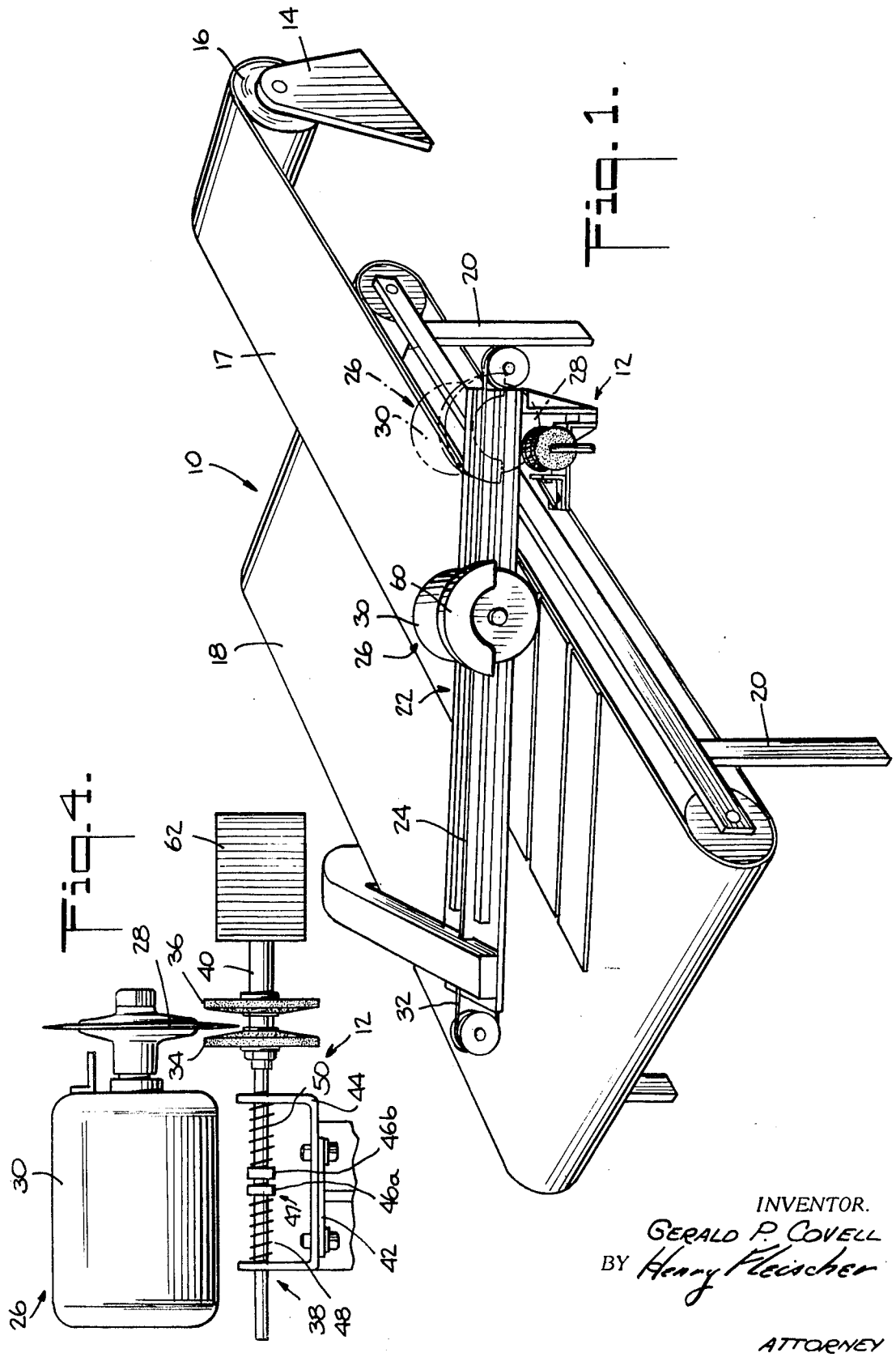

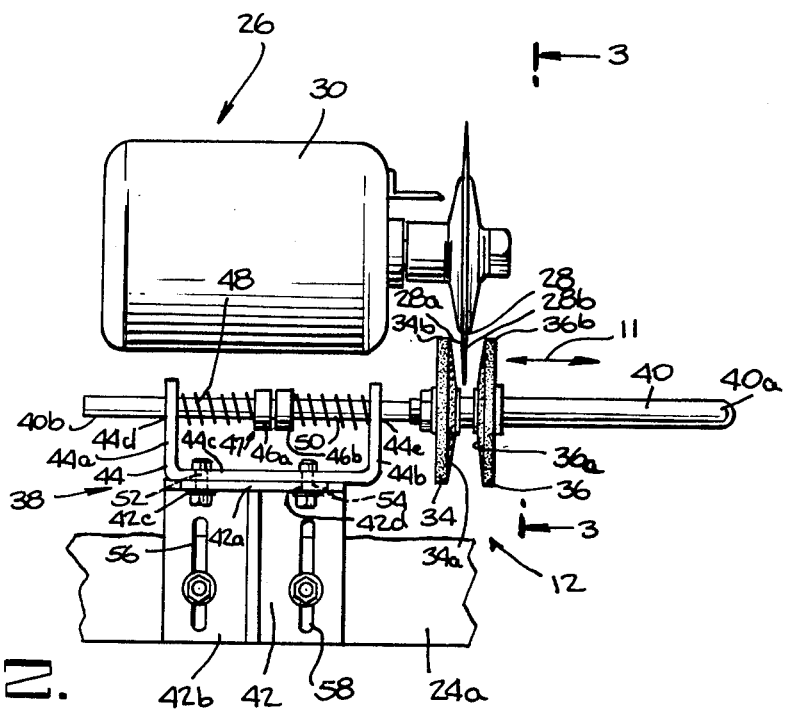
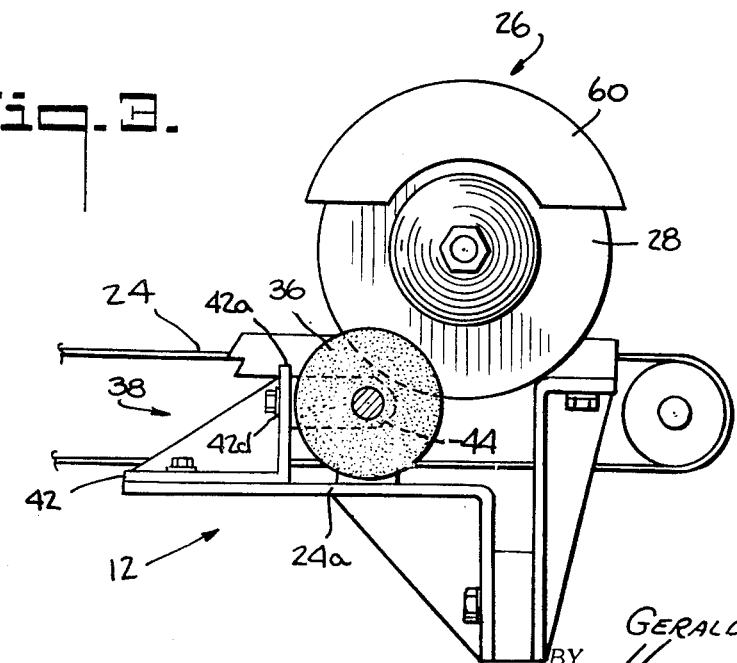

CUTTING MACHINE BLADE SHARPENER

BACKGROUND OF THE INVENTION

The present invention relates generally to a sharpener for a cutting blade, and more particularly concerns a sharpener affixed to a cutting machine for periodically honing the cutter assembly thereof.

Rubber coated fabrics are generally used in the manufacture of rubber tires to add strength to the completed tire. At present, a major portion of the tire fabric utilized by the rubber tire industry is cut and spliced into continuous strips by automatic cutting and splicing machines. A conventional automatic cutting and splicing machine is described in U.S. Pat. No. 3,192,094, issued to Phillips et al., on June 29, 1965. The cutting machine disclosed therein includes a cutter assembly which is positioned above the fabric to intermittently cut predetermined lengths of fabric into rhombic sections.

The typical cutter assembly includes a suitable rotary-power driven blade for severing the fabric into sections. After extended periods of usage, the rotary-power driven blade dulls with the corresponding result that the fabric sections are poorly cut, i.e., the sections are not severed cleanly from one another. In order to overcome the aforementioned difficulty, various procedures have been utilized for sharpening or honing the cutting edges of the rotary-power driven blade. One such procedure requires the shut down of the cutting machine, i.e., the cutter assembly thereof is stopped and the rotary-power driven blade removed therefrom. Thereupon, a suitable sharpening device, for example a conventional grinding machine, hones the rotary-power driven blade so that the cutting edges thereof are suitably sharpened. The rotary-power driven blade is thereafter replaced in the cutter assembly, the cutting machine thereupon being actuated and resuming operation.

However, in the method wherein the rotary-power driven blade is removed from the cutter assembly for honing the cutting edges thereof, the cutting machine is inoperative during the dismantling, grinding and reassembling operations. Thus, a considerable amount of machine time and labor are wasted by having to remove the blade from the cutter assembly during the honing thereof, thereby resulting in ensuing higher product costs.

An alternate method of honing the cutter assembly blade, wherein the cutting machine remains operative, is for the operator to place a suitable stone in engagement with the blade during the rotation thereof. However, this latter method represents a serious human safety hazard, inasmuch as the operator must lean over a blade which is rotating, and place his hands in close proximity thereto. Furthermore, the cutting edge formed thereby on the blade is not of a high quality, nor is it repeatable from operator to operator.

In order to overcome many of the disadvantages associated with the conventional methods heretofore utilized for honing the cutter assembly blade of cutting machines, there is, in accordance with the present invention provided a sharpener associated with a cutting machine for periodically honing the cutter assembly blade thereof.

Accordingly, it is a primary object of the present invention to provide a sharpener for periodically honing the cutter assembly blade of a cutting machine while the latter is operative.

Another object of the present invention is to provide a sharpener which hones the cutter assembly blade with minimal risk to the safety of the operator performing the task.

An additional object of the present invention is to provide a sharpener which hones both sides of the cutter assembly blade at a preselected position in the cutting cycle thereof.

A further object of the present invention is to provide a sharpener which is adaptable to automated procedures.

Still another object of the present invention is to provide a method of periodically honing the cutter assembly blade at a preselected position in the cutting cycle thereof.

Still an additional object of the present invention is to provide a method of honing automatically the cutter assembly blade at a preselected position in the cutting cycle thereof.

Still a further object of the present invention is to provide a sharpener which is relatively economical in the use and manufacture thereof.

SUMMARY OF THE INVENTION

Briefly stated, and in accordance with the present invention, there is provided a sharpening means operatively associated with a cutting machine for honing the cutter assembly blade. Preferably, the sharpening means includes a pair of grinding stones adapted to be in engagement intermittently with the cutter assembly blade at a preselected position in the cutting cycle thereof so as to hone the blade.

A typical cutting machine includes a stationary frame having a track secured thereon and a cutter assembly which is adapted for reciprocal movement along the track. The sharpening means is associated with the track such that the grinding stones may be actuated into engagement intermittently with the cutter assembly blade at a preselected position in the cutting cycle. The stones are biased to an at-rest position closely spaced from one another, the sharpening means being disposed such that the cutter assembly blade may be interposed therebetween and closely spaced therefrom during its reciprocal movement. The stones are moved in unison in a transverse direction relative to the direction of reciprocal movement of the cutter assembly blade, i.e., substantially normal to the cutting stroke, so that one stone is in engagement with a corresponding surface of the blade while the other stone is spaced from the blade. In this manner, one surface of the blade cutting edge is honed to a suitable degree of sharpness at a time. Thus, it is evident that each stone of the sharpening means may be periodically in engagement with its corresponding opposed surface of the cutter assembly blade so as to hone the blade as frequently as is required in order to produce cleanly severed tire fabric sections.

BRIEF DESCRIPTION OF THE DRAWINGS

Other objects and advantages of the present invention will become apparent upon reading the following detailed description and upon reference to the drawings in which:

FIG. 1 is a perspective view of the preferred embodiment of the present invention;

FIG. 2 is a fragmentary plan view of the preferred embodiment of the sharpener means of the present invention;

FIG. 3 is an enlarged fragmentary sectional elevationl view taken along the line 3—3 of FIG. 2 in the direction of the arrows; and FIG. 4 is a fragmentary plan view of the sharpening means of FIG. 2 being actuated automatically.

While the present invention will hereinafter be described in connection with a preferred embodiment and method of use associated therewith, it will be understood that it is not intended to limit the invention to that embodiment and associate method of use. On the contrary, it is intended to cover all alternatives, modifications and equivalents as may be included within the spirit and scope of the invention as defined by the appended claims.

DETAILED DESCRIPTION OF THE INVENTION

With continued reference to the drawings, wherein like reference numerals have been used throughout to designate like elements, FIG. 1 illustrates a cutting machine, designated generally at 10, having sharpening means, generally indicated by the reference numeral 12, affixed thereto.

Cutting machine 10 includes a fabric let-off unit 14 adapted to receive a roll 16 of fabric 17. The fabric 17 is unwound from fabric let-off unit 14 and advanced therefrom by an endless conveyor belt 18 driven by a suitable motor (not shown) and supported on stationary frame 20. A cutting means shown generally at 22, which is positioned above fabric 17, is utilized to intermittently cut fabric 17 into rhombic sections. As depicted in FIG. 1, cutting means 22 includes a track 24 mounted on stationary frame 20, and a cutter assembly, designated generally at 26, adapted for reciprocal movement along track 24 so as to sever fabric 17 during the cutting stroke thereof. Conveyor belt 18 advances fabric 17 beneath track 24 so as to enable cutter assembly 26 to sever the fabric into the requisite rhombic sections during the cutting stroke thereof.

Cutter assembly 26 includes a rotary-power driven blade 28 and a motor 30 connected therewith for rotating blade 28. A drive motor (not shown) is drivingly coupled with cutter assembly 26 by means of an endless link chain 32 so as to advance cutter assembly 26 through the return stroke and the cutting stroke, i.e., reciprocal movement, on track 24. Cutter assembly 26 traverses the entire width of fabric 17 on track 24 during the cutting stroke thereof, as indicated in solid lines in FIG. 1. When cutter assembly 26 reaches a selected position on track 24, sharpening means 12 may be engaged with blade 28 so as to hone the cutting edge thereof, as indicated in phantom in FIG. 1.

Turning now to FIGS. 2 and 3, wherein sharpening means 12 is shown more clearly. Sharpening means 12 includes a pair of disc-like abrasive members or stones 34 and 36 which are supported by plate 24a of track 24 so as to be adapted to hone rotary-power driven blade 28 at a preselected position along track 24, e.g., preferably at the end of the cutting stroke thereof. A support means, designated generally at 38, resiliently maintains stones 34 and 36 in an at-rest position spaced closely from one another. Stones 34 and 36 are supported in the at-rest position such that blade 28 is interposed therebetween and spaced therefrom at the end of the cutting stroke. The stones 34 and 36 include substantially annular disc shaped body portions 34b and 36b, respectively, and beveled grinding portions 34a and 36a, respectively. Stones 34 and 36 are adapted for movement in unison with one another in a direction substantially perpendicular to the direction of the reciprocal movement of cutter assembly 26. Hence, one stone will be in engagement with blade 28 while the other stone is spaced therefrom. For example, when stone 34 has the beveled portion 34b thereof in engagement with surface 28a of blade 28, stone 36 is spaced from surface 28b of the blade 28. Moreover, when stone 36 has the beveled portion 36b thereof in engagement with surface 28b of blade 28, stone 34 is spaced from surface 28a of the blade 28.

As shown in FIG. 2, support means 38 includes shaft member 40, bracket member 42 and guide member 44. Stones 34 and 36 are mounted at one end portion 40a of shaft member 40, i.e., in a cantilever type of support. The other end portion 40b of shaft member 40 is supported for endwise slidable movement and rotation by guide member 44. Shaft member 40 is, preferably, a substantially cylindrical member being adapted to be moved in a direction perpendicular to the cutting stroke, i.e., endwise sliding in guide member 44. Generally the operator will hold shaft member 40 in the region of its end portion 40a. When blade 28 is interposed between stones 34 and 36 the operator will slide shaft 40 relative to guide member 44 by pushing or pulling on end portion 40a thereof so that either stone 34 or 36 engages blade 28. Moreover, shaft member 40 is adapted to be manually rotated about its longitudinal axis relative to guide member 44 so that successive portions of stones 34 and 36 engage blade 28, thereby prolonging the useful life of the stones. The aforementioned rotation of shaft member 40 may be performed simultaneously with the push-pull movement thereof.

Guide member 44 is preferably U-shaped, having a pair of opposed end portions 44a and 44b integrally connected to one another by a back portion 44c. An aperture 44d, in end portion 44a, is substantially coaxially aligned with an aperture 44e in end portion 44b. Preferably, apertures 44d and 44e are substantially of a round or circular cross-section. Shaft member 40 has end portion 40b thereof passing through the coaxially aligned apertures 44d and 44e so as to be slidably and rotatably supported thereby.

Biasing means, shown generally by reference numeral 47, maintains shaft member 40 in the at-rest position for permitting blade 28 to remain interposed between and spaced from stones 34 and 36, respectively, at the end of its cutting stroke. The biasing means 47 includes collars 46a and 46b, and a pair of resilient members 48 and 50, respectively. Collars 46a and 46b are preferably tubular members affixed on shaft member 40 at about midway between end portions 44a and 44b of guide member 44. First resilient member 48, preferably a helical coil spring, is wound about shaft member 40 so as to be interposed between and in engagement with collar 46a and end portion 44a of guide member 44. Similarly, second resilient member 50, also preferably a helical coil spring, is wound about shaft member 40 so as to be interposed between and in engagement with collar 46b and end portion 44b of guide member 44. It is evident therefore, that when shaft member 40 is moved axially away from the at-rest position thereof, as indicated by arrow 11 (FIG. 2), one spring, i.e., either spring 48 or 50 depending upon the direction of movement, will be compressed a greater amount than the other spring so as to develop a restoring force which subsequently returns shaft member 40 to its at-rest position. Hence, when the operator releases end portion 40a of shaft member 40, shaft member 40 will return to its at-rest position, i.e., where springs 48 and 50 are compressed about an equal amount.

Referring once again to FIG. 2, guide member 44 includes a pair of slots 52 and 54 in back portion 44c thereof. Slots 52 and 54, which are substantially parallel to one another, extend in substantially a vertical direction substantially normal to the axial direction of movement of shaft member 40 as indicated by arrow 11. Guide member 44 is slidably fastened to bracket member 42 by a pair of suitable bolts passing through slots 52 and 54 so as to be adjustable relative to bracket member 42 in substantially a vertical direction. Hence, stones 34 and 36 are adjustable in substantially a vertical direction relative to track 24 so as to be positioned such that blade 28 may be interposed therebetween at the end of the cutting stroke thereof.

Bracket member 42 is substantially L-shaped, leg 42a thereof being adapted to support guide member 44 and leg 42b thereof being adapted to be connected to plate 24a of track 24. Leg 42a includes a pair of apertures 42c and 42d therein, the apertures 42c and 42d being preferably round or of a circular cross-section. Apertures 42c and 42d are positioned at about an equal distance from leg 42b, apertures 42c and 42d being spaced from one another a distance about equal to the distance between slots 52 and 54 of guide member 44. Hence, suitable bolts pass through apertures 42c and 42d and corresponding slots 52 and 54 so as to slidably secure guide member 44 to leg 42a of bracket member 42. Leg 42b includes a pair of slots 56 and 58 therein. Slots 56 and 58 are arranged substantially parallel to one another and extend substantially in a horizontal direction substantially normal to the axial direction of movement of shaft member 40 as indicated by arrow 11. Bracket member 42 is preferably slidably fastened to plate 24a by a pair of suitable bolts passing through slots 56 and 58 so as to be adjustable relative to track 24 in substantially a horizontal direction. Thus, by adjusting bracket member 42 relative to track 24 and guide member 44 relative to bracket member 42, stones 34 and 36 may be readily adjusted in both the horizontal and vertical directions such that, in the at-rest position thereof, blade 28 is interposed therebetween and closely spaced therefrom.

By way of example, shaft member 40, bracket member 42, and guide member 44 all are made preferably of a substantially rigid material, such as a suitable metal. Collars 46a and 46b also are preferably of a asubstantially rigid material, such as a suitable metal, plastic or rubber. Springs 48 and 50 are made preferably of a spring steel wire having a diameter of about 0.055 inches. The wire is wound into a helical coil with about a 0.720 inch outer diameter and a free length of about 2.5 inches. The springs 48 and 50, each have preferably a spring constant of about 6.6. lbs./inch.

Turning once again to FIG. 1, the upper half of rotary-power driven blade 28 has a safety housing 60 surrounding the blade so as to prevent inadvertent injury to the operator. Thus, sharpening means 12 is preferably disposed beneath rotary-power driven blade 28 at one end of the cutting stroke thereof. While the sharpening means is preferably positioned at one end of the cutting stroke of the rotary-power driven blade it will be obvious to a man skilled in the art, that the sharpening means may be disposed at any point therealong, provided that the sharpening means does not interfere with the cutter assembly during the cutting stroke thereof. For example, the aforementioned could be achieved by mounting the sharpener means above the cutter assembly along the track, and by suitably modifying the bias-cutter to account for this location.

In operation the rotary-power driven blade cuts the tire fabric during its cutting stroke. When the rotary-power driven blade reaches the end of its stroke and is interposed between the stone of the sharpening means, the operator grasps end portion 40a of shaft member 40 and axially slides shaft member 40, in the direction as indicated by arrow 11 of FIG. 2, until one or the other of the stones 34 and 36 engage blade 28 so as to hone the corresponding surfaces 28a and 28b of the blade 28. The cutting edge of blade 28 is honed to a suitable degree of sharpness by rotating the blade while in engagement with one of the stones which removes material therefrom. Preferably, one surface is honed at a time, e.g., first surface 28a would be honed when blade 28 reaches the end of its cutting stroke, and thereafter, at the end of the same cutting stroke, surface 28b would be honed.

The method of honing the rotary-power driven blade heretofore described is manual. However, it is evident that automatic means could be utilized to control the sharpening means. Referring now to FIG. 4, sharpening means 12 is illustrated therein as including automatic means 62 for regulating the honing of cutter assembly blade 28. Automatic means 62 is operatively associated with shaft member 40 so as to intermittently slide stones 34 and 36 alternately into engagement with the corresponding surfaces 28a and 28b of blade 28. For example, automatic means 62 may include suitable counters, limit switches, relays and solenoid valves. A counter determines the number of times cutter assembly blade 28 has reached the end of its cutting stroke. After a preselected number of cutting strokes, i.e., after a sufficient period of usage such that the blade is dulled, the counter closes a relay so that when blade 28 reaches the end of its next successive cutting cycle a suitable limit switch closes. The limit switch actuates a suitable time delay which, in turn, energizes a suitable solenoid valve for moving shaft member 40 so as to engage stone 34 or 36 with the corresponding surface of blade 28. After a suitable period of time the time delay relay opens and de-energizes the corresponding solenoid valve so as to enable spring 48 or 50 to return shaft member 40 to its at-rest position. In a similar fashion the other surface of blade 28 may be honed by the other corresponding stone. Thus, in accordance with the aforementioned example, both cutting edges of blade 28 may be honed by sharpening means 12 regulated by suitable automatic means 62.

Hence, it is evident that the sharpening means of this invention is adapted to achieve the various aims and objects hereinbefore set forth. Namely, in accordance with the present invention, the sharpening means enables the cutter assembly blade of a cutting machine to be honed while the latter is operative with a minimal safety risk to the operator thereof. Moreover, the sharpening means hones the surfaces of the blade at a preselected position in the cutting cycle of the cutter assembly. In addition, the sharpening means of the present invention may be readily controlled by automatic means. Furthermore, the sharpening means substantially reduces production costs, may be easily manufactured and is relatively simple in the use thereof.

Thus, it is apparent that there has been provided, in accordance with the present invention, a sharpening means and a method of use associated therewith that fully satisfies the objects, aims and advantages heretofore set forth. While the invention has been described in conjunction with a specific embodiment and associate method of use thereof, it is evident that many alternatives, modifications and variations will be apparent to those skilled in the art in light of the foregoing description. Accordingly, it is intended in the appended claims to embrace all such alternatives, modifications and variations as fall within the spirit and broad scope of this invention.

Having thus described my invention, what I claim and desire to protect by Letters Patent is:

1. A machine for cutting a fabric, comprising:
    a stationary frame;
    means for cutting fabric, said cutting means including a fixed track mounted on said frame and a cutter assembly adapted for reciprocal movement along said track so as to sever the fabric into sections during a cutting stroke; and
    means for sharpening the cutter assembly, said sharpening means being operatively associated with said track so as to be adapted for engagement intermittently with said cutter assembly at a preselected position in a cutting cycle and hone a cutting edge of said cutter assembly to a requisite degree of sharpness.

2. A machine as recited in claim 1, wherein said sharpening means comprises at least one abrasive member supported by said track to engage intermittently said cutter assembly at said preselected location in the cutting cycle thereof.

3. A machine as recited in claim 1, further comprising means for actuating automatically said sharpening means in response to said cutter assembly reaching said preselected position on said track in the cutting cycle thereof.

4. A machine as recited in claim 1, wherein said cutter assembly comprises:
    a rotary-power driven blade mounted for reciprocating movement on said track, said blade being adapted to cut the fabric during the reciprocal movement thereof;
    means for reciprocating said blade along said track; and
    means for rotating said blade.

5. A machine as recited in claim 4, wherein said sharpening means comprises:
    a pair of stones for sharpening said blade; and
    means for supporting said pair of stones so as to resiliently urge said pair of stones to an at-rest position closely spaced from one another for permitting said blade to be interposed therebetween and closely spaced therefrom, said pair of stones being adapted for movement in unison in substantially a perpendicular direction relative to the direction of reciprocating movement of said blade to thereby position one of said pair of stones into engagement with a corresponding opposed surface of said blade, the other of said pair of stones being spaced from the other corresponding opposed surface of said blade.

6. A machine as recited in claim 5, wherein each of said pair of stones is substantially an annular disc shaped member including a beveled portion adapted for engagement with the respective corresponding opposed surfaces of said blade.

7. A machine as recited in claim 5, wherein said support means comprises:
    a bracket member mounted on said track so as to be adjustable slidably in substantially a horizontal direction;
    a guide member mounted on said bracket member so as to be adjustable slidably in substantially a vertical direction;
    a shaft member mounted rotatably and endwise slidably on said guide member, said pair of stones being secured to said shaft member in the region of one end portion thereof; and
    means for biasing said shaft member to an at-rest poistion so as to permit said blade to be interposed between and closely spaced from said pair of stones.
    means for supporting said pair of stones so as to resiliently urge said pair of stones to on at-rest position closely spaced fromone another for permitting said blade to be interposed therebetween and closely spaced therefrom, said pair ofstones being adapted for movementin unison in substantially a perpendicular direction relative to thedirection of reciprocatng movement of said blade to thereby position oneofsaid pairof stones into engagement wit a corresponding opposed surface of said blade,theother of said pair of stones being spaced fromtheother corresponding opposed surface ofsaid blad.

* * * * *

PO-1050
(5/69)

UNITED STATES PATENT OFFICE
CERTIFICATE OF CORRECTION

Patent No. 3,736,825                    Dated June 5, 1973

Inventor(s) Gerald P. Covell

It is certified that error appears in the above-identified patent and that said Letters Patent are hereby corrected as shown below:

Column 8, line 36, change "poistion" to --position--; and

Column 8, lines 39-50, delete in entirety.

Signed and sealed this 16th day of April 1974.

(SEAL)
Attest:

EDWARD M. FLETCHER, JR.
Attesting Officer

C. MARSHALL DANN
Commissioner of Patents